United States Patent [19]
Tompkins et al.

[11] Patent Number: 6,048,153
[45] Date of Patent: *Apr. 11, 2000

[54] SYSTEM, APPARATUS AND METHOD FOR LOADING AND/OR UNLOADING A BARGE

[75] Inventors: Edward E. Tompkins, deceased, late of Salem, Oreg., by Debora Jensen, Legal Representative; F. Michael Bauer, Salem, Oreg.

[73] Assignee: Valley Equipment, Salem, Oreg.

[ * ] Notice: This patent issued on a continued prosecution application filed under 37 CFR 1.53(d), and is subject to the twenty year patent term provisions of 35 U.S.C. 154(a)(2).

[21] Appl. No.: 09/160,229

[22] Filed: Sep. 24, 1998

[51] Int. Cl.⁷ ..................................................... B63B 27/22
[52] U.S. Cl. .................................... 414/139.4; 414/139.8; 414/142.2
[58] Field of Search ..................................... 198/519, 508; 414/140.9, 142.2, 803, 139.8, 142.1, 142.5, 143.1, 139.4

[56] References Cited

U.S. PATENT DOCUMENTS 1,058,306  4/1913  Kindl ................................... 414/140.9
3,612,303  10/1971  Ikeda ..................................... 414/142.2
4,962,846  10/1990  Nakao et al. ..................... 414/140.7 X
5,024,568  6/1991  Johnston ........................... 414/140.9 X

FOREIGN PATENT DOCUMENTS

1 044 711  11/1958  Germany ............................. 414/140.9

Primary Examiner—Janice L. Krizek
Attorney, Agent, or Firm—Robert L. Harrington

[57] ABSTRACT

A system for loading and unloading a barge. The system includes two gantry assemblies, one for loading and one for unloading. The gantry assemblies are mounted on tracks for traversing the length of the barge. One gantry assembly has a hopper for receiving material and a movable conveyor for distributing the material across the width of the barge. The barge is moved relative to the docking site and the gantry is moved relative to the barge to maintain the gantry in position relative to loading equipment. The second gantry assembly is used to unload cargo from the barge. The second gantry has dual pick up conveyors for elevating the material onto a conveyor system which transports the material to a receiving site. The second gantry is moved along the length of the barge to remove the material in layers. Material is removed as the gantry moves in each direction.

14 Claims, 6 Drawing Sheets

FIG. 9

SYSTEM, APPARATUS AND METHOD FOR LOADING AND/OR UNLOADING A BARGE

FIELD OF THE INVENTION

This invention relates to transporting loose material (gravel, grain, etc.) between ports along a waterway and more particularly it relates to transporting such materials in a large, flat bottomed barge and the loading and particularly the unloading of the material from the barge.

BACKGROUND OF THE INVENTION

A barge can be a very efficient mode of transportation for transporting large volumes of loose material such as gravel, grain and the like. The barge size is limited by the restrictions in the waterway, e.g., the water depth, the locks through which the barge must pass, etc. These restrictions for many navigable waterways nevertheless permit the use of a very large barge to the extent that the greater problem is efficient loading and unloading of the material to and from the barge.

Loading and unloading operations also require special consideration to insure that the load on the barge at any point in time is not unduly unbalanced. During loading and unloading, should it happen that one end versus the other, or one side versus the other, is substantially unbalanced, the barge could overturn. Even loading both ends and not the middle can severely strain the structure as the ends are held down by the load and the buoyancy of the unloaded middle results in an upward thrust that produces a bending force. Even providing the completed load with a crown, i.e., more load in the center of the barge, is not desirable if such raises the center of gravity and renders the barge more likely to tip, e.g., in severe weather conditions.

There are two common methods of unloading a barge. The first is the use of a crane fitted with a clam shell bucket and the barge is unloaded bucket load by bucket load. To apply such a method to a barge of the size contemplated herein would require that the barge be tied up for days and such is not acceptable. A much faster unloading method is the self-unloading barge wherein the barge is designed to have a conveyor under the hold of the barge, the hold is provided with a bottom channel that overlies the conveyor. For unloading the channel is opened and allows the material to gravity feed onto the conveyor and the conveyor conveys the material through conveyor linkages onto the shore. This latter design requires concessions in the design of the hold, e.g., converging sides that narrow to the channel for gravity feed, and such concessions substantially impact on the capacity of the hold. Both methods require precautions to avoid load imbalance.

It is accordingly an object of the present invention to provide efficient and even loading and unloading of a barge, which is primarily applicable to a flat bottomed, straight side walled hold for a barge that is very large in its capacity.

SUMMARY OF THE INVENTION

In the preferred embodiment, the present invention contemplates a hold that is in the order of 300 feet long by 80 feet wide by ten feet in depth and has a capacity to haul many tons of gravel/rock. A track assembly is provided along the top edge of each side wall and mounted to the track is both a loading gantry and an unloading gantry. Each gantry is able to travel the length of the hold and when one is operating the other is parked at one of the ends of the hold.

The loading gantry is first explained although it is to be understood that the primary focus of the invention applies to the unloading gantry and its related components and the unloading gantry is claimed separate and apart from the loading gantry.

The loading gantry contemplates a fixed position of material input to the barge from which material is transported from offshore. For example, it is assumed that the offshore loading conveyor will be capable of depositing rock to an overhead center position relative to the hold of the barge. The loading gantry provides a receiving hopper that can be positioned under the unloading conveyor, the hopper acting like a funnel and depositing the material onto an underlying conveyor section that is part of the gantry. The conveyor section has a length about one-half the width of the hold and is movable along the gantry from one side of the hold to the other. The conveyor is also reversible so as to convey the material toward either end of the conveyor.

The hopper remains fixed and as material is deposited onto the conveyor, the conveyor moves along the gantry toward one side and back to the center, and then toward the other side and back to the center. By selectively reversing the direction of the conveyor, the material can be conveyed off either end of the conveyor and accordingly across the entire width of the hold. To manipulate loading from end to end, the barge is moved forward and back but with the loading gantry paced to move in the reverse direction to maintain the hopper in the same position under the offshore loading conveyor. Such movements of the gantry and conveyor provides for even filling of the barge.

When the barge is loaded, the loader gantry can be parked at one end (e.g., opposite to where the unloading gantry was parked during loading). When the barge is to be unloaded, the unloading gantry is moved by appropriate motor means along the track assembly to a position over the loaded material. It is here assumed, of course, that the barge has completed its waterway voyage and is now anchored at the port whereat material is to be deposited.

The unloading gantry is controllably driven along the track assembly from one end of the hold to the other repeatedly during the unloading operation. The unloading gantry is provided with a secondary track assembly along its length that enables a pick up structure to travel from one side of the hold to the other. There may be more than one pick up structure and the detailed disclosure which follows includes a pair of such pick up structures. The pick up structures are capable of being operated independently of one another and cooperatively but are duplicates of one another and only one such structure will be included in the present description.

The pick up structure includes a pair of pick up conveyors that are pivotally mounted to the pick up structure. One conveyor arm extends angularly and downwardly toward one end of the hold, e.g., the forward end, and the other conveyor extends toward the other end of the hold, e.g., the rear end. Both pick up conveyors are similarly equipped and perform the same function. The first conveyor operates when the gantry moves toward the front end of the hold, and upon reversal, the front pick up conveyor is rendered non-operative and the rear conveyor is rendered operative as the gantry moves rearward.

Operation of the pick up conveyor involves pivoting the extended or distal end of the conveyor down to the underlying material in the hold. A shear blade at the end of the conveyor is positioned to penetrate through the material at, e.g., a six inch depth, as the gantry travels along the track assembly. Immediately rearward of the shear blade is the conveyor belt that receives the six inch layer of material and conveys the material up the conveyor to the pick up gantry.

A reel member overlying the shear blade rotates through the material to urge the material over the shear blade and onto the conveyor.

Mounted on the pick up gantry and extending the length of the gantry and between the two oppositely directed pick up conveyors is a gantry conveyor that receives material from either pick up conveyor and deposits the material at one side of the hold. At that side of the hold is a side conveyor that runs the length of the hold and receives the material from the gantry conveyor and conveys the material to one end of the hold. An end conveyor (e.g., mounted on the end wall of the hold) conveys the material to an unloading conveyor which is pivotable laterally and vertically and is adjusted to extend out over the shore for depositing the material on shore.

In operation, the pick up gantry moves back and forth between the ends as first one conveyor arm and then the other receives material. At the end of each run (or as determined most feasible) the conveyor arms are indexed across the length of the pick up gantry (the width of the load) so as to evenly peel off layers of the material. For example, the pick up conveyor width may be 1/16 the width of the hold requiring sixteen end-to-end passes of the gantry (eight forward and eight rearward) to cover the entire width of the hold. If the material is eight feet deep, the conveyor arms will have to make sixteen cycles (each cycle removing a six inch layer). The pick up gantry will make over one hundred round trip passes to empty the hold but each pass can be completed in minutes and the entire unloading operation can be completed in a matter of a few hours rather than a couple of days.

The various components and the inter-relationship of the components of the systems herein will be fully appreciated and understood upon reference to the following detailed description and the accompanying drawings.

DESCRIPTION OF THE PREFERRED EMBODIMENT

Figure 1:
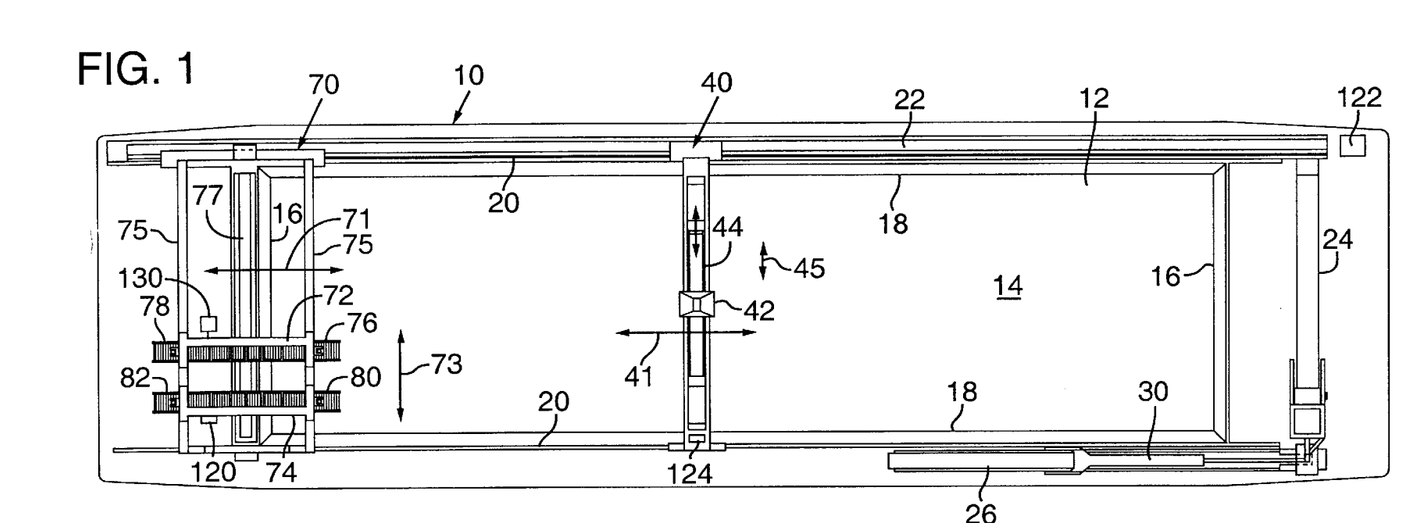
FIG. 1 is a top view of a barge incorporating a system of the present invention for loading and unloading cargo.
Figure 2:
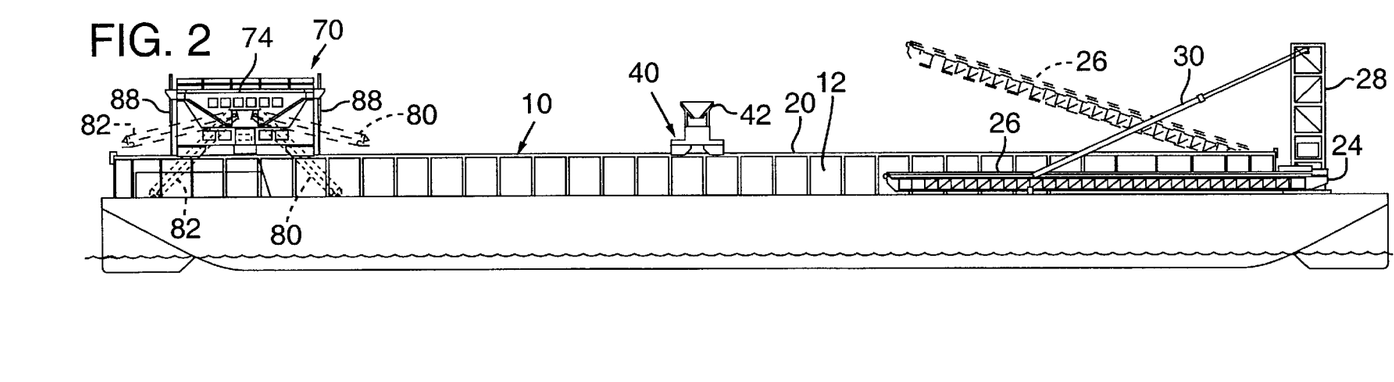
FIG. 2 is a side view of the barge of FIG. 1.

FIGS. 1 and 2 illustrate a barge 10 that incorporates a system for loading cargo to and unloading cargo from a hold 12. It is contemplated that the barge 10 is of the type that will transport loose material such as gravel, rock and the like. The hold 12 is constructed to maximize the load carrying capacity of the barge 10 and has an essentially flat bottom 14 with upstanding end walls 16 and side walls 18.

Tracks 20 are provided on the top side of each of the side wall structures. The tracks 20 are provided for gantry assemblies 40 and 70. The gantry assembly 40 is used for loading cargo into the hold 12 of the barge 10 and the gantry assembly 70 is used to unload or offload the cargo received in the hold 12 of the barge 10. A conveyor 22 is provided along one side wall 18 of the barge 10. A cross conveyor 24 is provided on one end of the barge 10 (beyond end wall 16) and is coupled to the conveyor 22. The cross conveyor 24 delivers material to an unloading conveyor 26 that is pivotally mounted to a tower 28. The unloading conveyor 26 may be pivoted upwardly and downwardly by a cylinder 30 and is also pivotable by a known pivot mechanism 32 so that the end of the unloading conveyor will extend outwardly from the barge 10.

The Loading Structure and Operation

Figure 3:
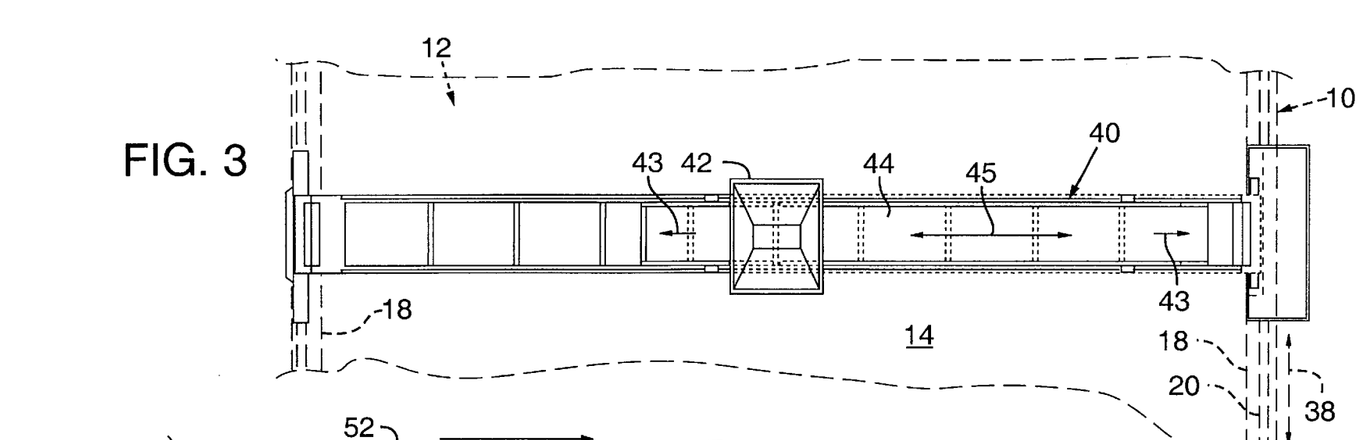
FIG. 3 is a top view of a gantry assembly for unloading cargo onto the barge of FIG. 1.
Figure 4:
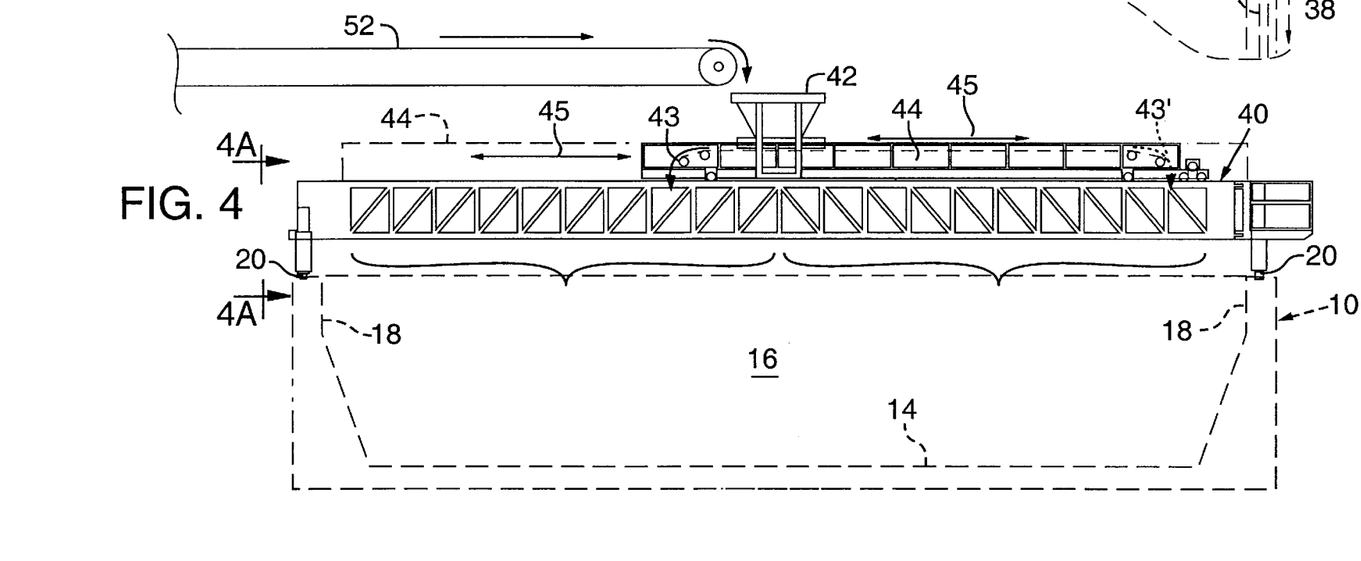
FIG. 4 is a side view of the gantry assembly of FIG. 3.

The gantry assembly 40 (best seen in FIGS. 3 and 4) is utilized to load material into the hold 12 of the barge 10. The gantry assembly 40 is movable from end to end of the barge 10 (indicated by directional arrows 38) on the tracks 20. Thus, the gantry 40 may be positioned at any position along the length of the hold 12. Additionally, when the gantry assembly 40 is not in use, it is parked adjacent to the cross conveyor 24 at one end of the barge 10 (See FIG. 9).

The gantry assembly 40 (see FIGS. 3 and 4) has a hopper 42 for receiving material from offshore conveyor 52 to be loaded onto the barge 10. The hopper 42 directs the material onto a conveyor 44 that is mounted to the gantry assembly 40. The conveyor 44, as shown by the solid and dashed lines of FIG. 4 and indicated by arrow 45, is movable along the gantry 40. The conveyor 44 is reversibly driven such that material may be delivered off of either end of the conveyor 44 as indicated by arrows 43 and 43'. When the conveyor 44 is driven in one direction, material is deposited from the center of the barge to one side of the barge 10. The conveyor 44 is moved along the gantry 40 to control the point of discharge of the material. When the conveyor 44 is driven in the opposite direction, material is deposited from the center of the barge to the opposite side. Thus, as described, the conveyor 44 enables material to be deposited at any position between the sides of the hold.

Figure 5:
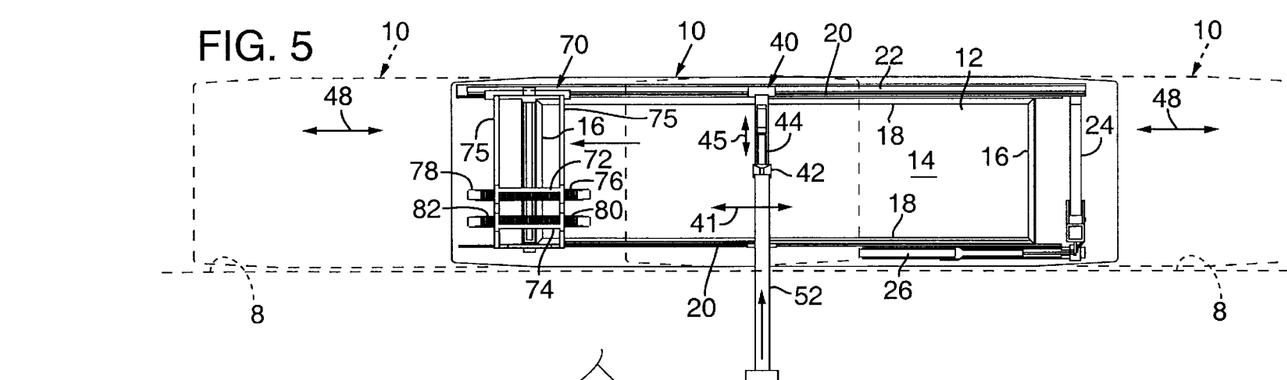
FIG. 5 illustrates in diagram form the manner of unloading cargo onto the barge of FIG. 1.

The operation of loading material onto the barge 10 is illustrated in FIG. 5. The barge 10 is positioned alongside a dock or other facility and an offshore conveyor 52 will typically deliver material to the hopper 42 of the barge 10. The conveyor 44 will receive material from the hopper and transport the material for selective deposit into the hold 12. The conveyor 44 is reversibly operable to deliver the material off of either end (arrows 43, 43' in FIG. 4) and is movable on the gantry assembly 40 so that the material may be deposited across the width of the hold 12. The barge 10 is moved relative to the loading dock as indicated by arrows 48. As the barge 10 is moved along the dock, the gantry assembly 40 is moved relative to the barge 10 such that the gantry assembly 40 and thus the hopper 42 remain fixed relative to the conveyor 52. Thus, the gantry and barge movement in combination with the conveyor 44 movement provides even loading both along the length and across the width of the hold.

The Unloading Structure and Operation

Cargo is offloaded or unloaded from the barge 10 by pick up conveyors 76, 78, 80, and 82 mounted to gantry 70, generally illustrated in FIGS. 1 and 2. The gantry 70 is movably mounted on the tracks 20 with the gantry 70 being movable from one end of the barge 10 to the other as indicated by arrow 71. In this embodiment, two carriages 72, 74 are movably mounted on the gantry 70. Each carriage 72, 74 is independently movable along the length of the gantry 70 on track assemblies 75 as indicated by arrow 73. The carriage 72 has pick up conveyors 76, 78 with the conveyor 76 extending on one side of the carriage 72 and the conveyor 78 extending on the opposite side of the carriage 72. Similarly carriage 74 has pick up conveyors 80, 82 with the conveyor 80 extending on one side of the carriage 74 and conveyor 82 extending on the opposite side of the carriage 74. Each of the conveyors mounted to the carriages 72, 74 are pivotally mounted such that their distal ends may be raised and lowered relative to the hold 12 of the barge 10. The conveyors 76, 78, 80 and 82 are elevated and lowered by cylinders 88.

Figure 6:
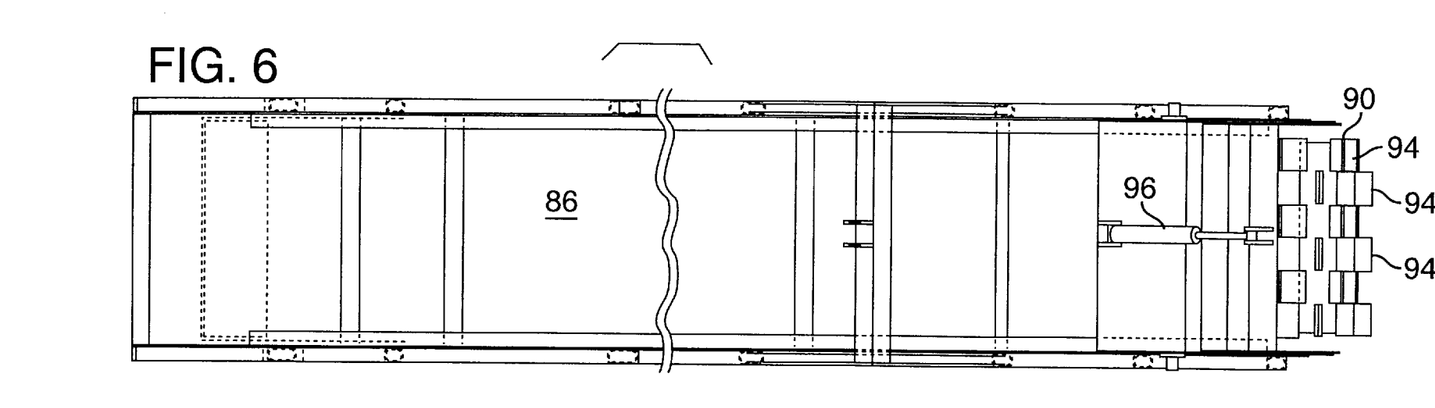
FIG. 6 is a top view of a pick up conveyor used for unloading cargo.
Figure 7:
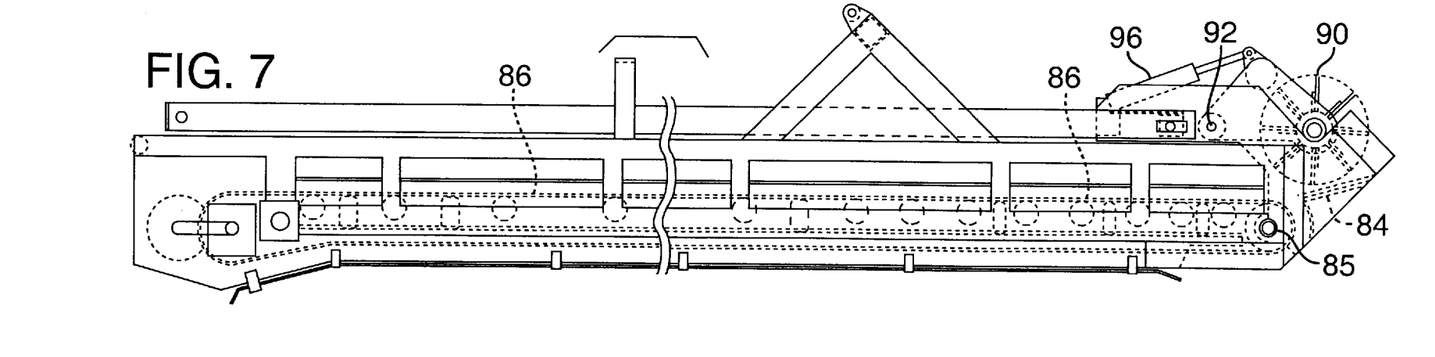
FIG. 7 is a side view of the pick up conveyor of FIG. 6.
Figure 8:
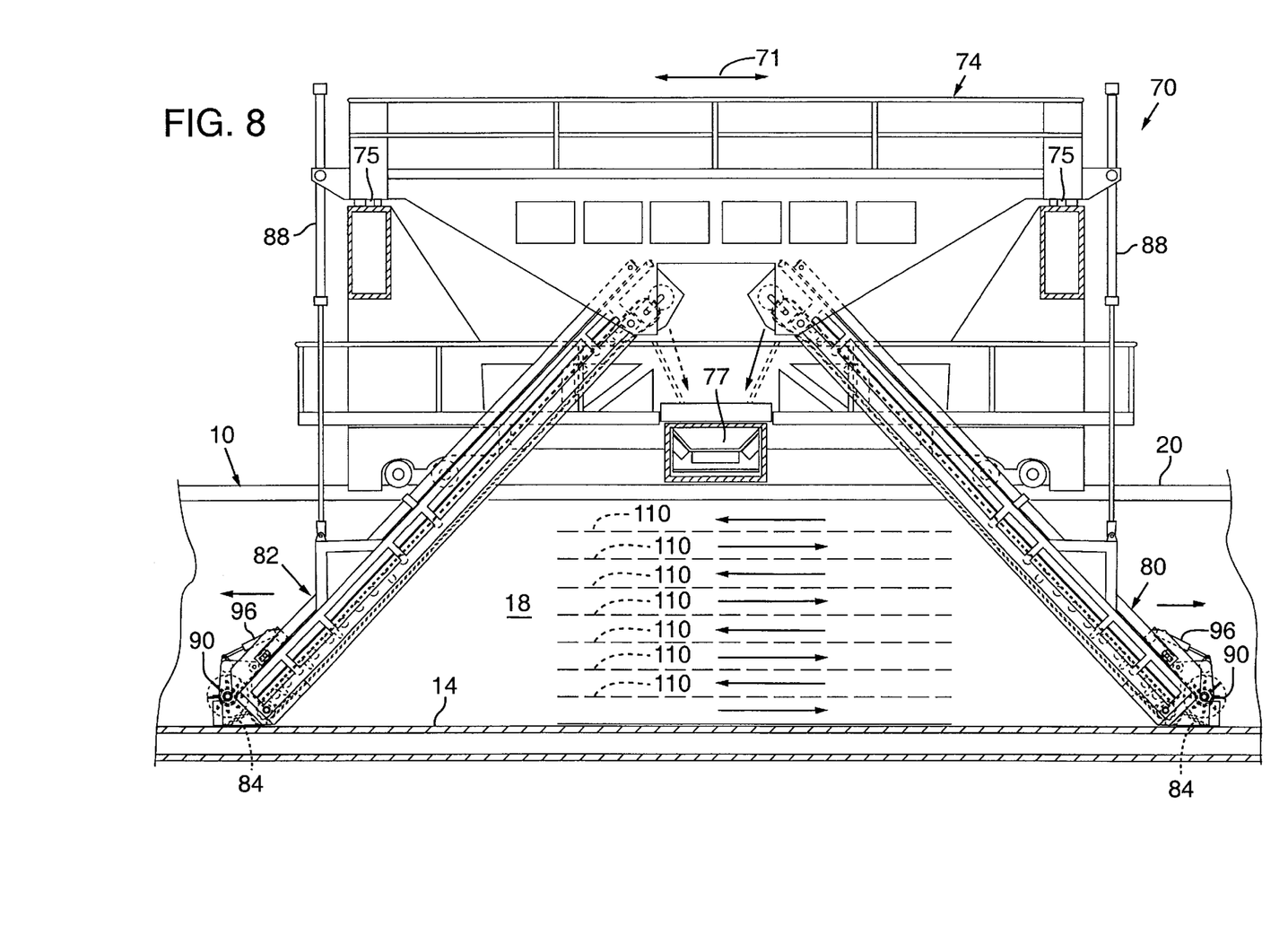
FIG. 8 is a view as taken on view line 8—8 of FIG. 9, an enlarged detailed view of a gantry assembly for unloading cargo incorporating a pick up structure having a pair of pick up conveyors.
Figure 8A:
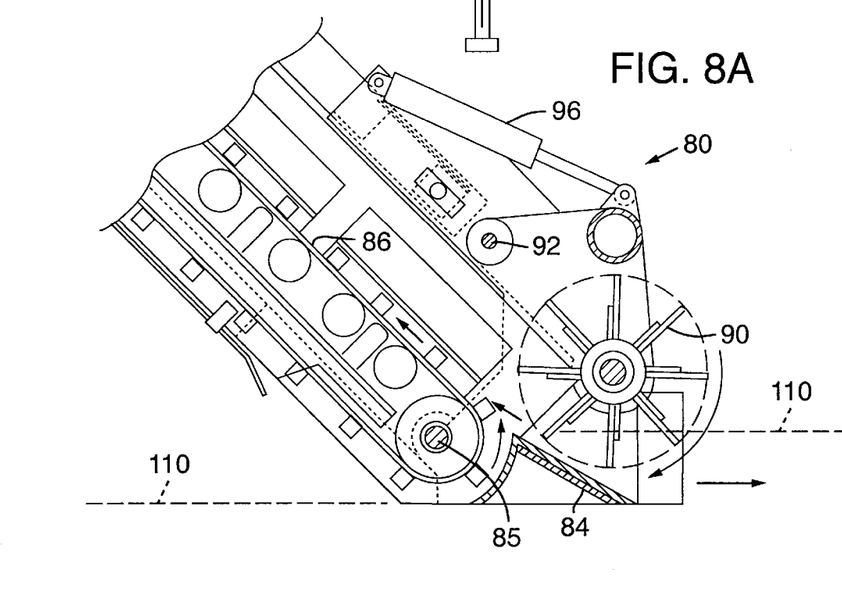
FIG. 8A is a further enlarged view of the distal end of a pick up conveyor.

The conveyors 76, 78, 80 and 82 are further illustrated in FIGS. 6, 7 and 8. The distal end of each of the conveyors has a blade 84 (see FIGS. 7 and 8A) that extends from the end of the conveyor and is positioned strategic to lower belt sprocket 85 that supports the conveyor belt 86. A powered reel 90 is mounted near the distal end of the conveyors and is adjustably movable about a pivot axis 92. A reel 90 extends substantially across the width of each of the conveyors 76, 78, 80 and 82. Each reel 90 has extending replaceable paddles 94 that will engage the material to be removed from the hold as will later be explained. The reel 90 is pivoted about its pivot axis 92 by a cylinder 96. The reel 90 thus may be adjusted upwardly and downwardly toward and away from the blade 84 and the belt sprocket 85.

Figure 9:
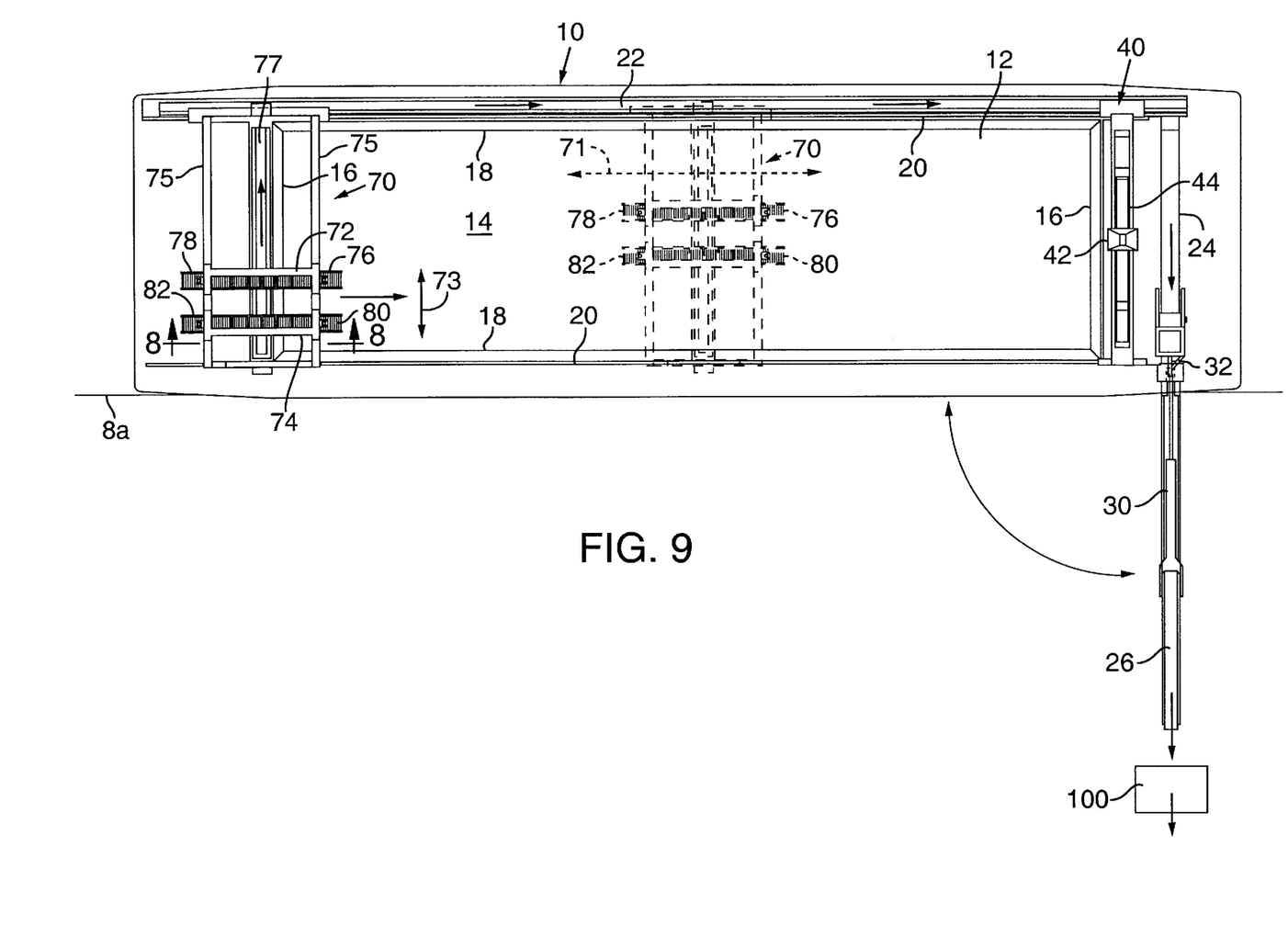
FIG. 9 illustrates in diagram form the manner of unloading cargo from the barge of FIGS. 1 and 2.

Refer now to FIG. 9 of the drawings but also referring to the enlarged view of FIG. 8. The barge 10 is unloaded at a docking facility, such as a dock 8a, that is suited for receiving the material that is loaded on the barge 10. The unloading conveyor 26 is pivoted upwardly and outwardly away from the barge 10 and is positioned strategic to material handling equipment 100 at the receiving site (dock 8a). The loading gantry 40 has been positioned at one end of the barge 10 near the cross conveyor 24 and thus is out of the way of the operation of the gantry 70.

The gantry 70 is typically positioned or parked during non-use, at the end opposite of the cross conveyor 24. As may be required, the gantry 70 is moved in a direction away from that end to a start position. The pick up conveyors 76 and 80 are lowered downwardly toward the material in the hold 12 such that the blade 84 of each conveyor will be engaged with the material 98 (see FIG. 8A). The gantry 70 is then moved toward the opposite end of the barge 10, that is, toward the cross conveyor 24. Depending on the material 98 in the hold 12, the conveyors 76 and 80 will be lowered such that the blade 84 will penetrate the material at a depth of about 6–10 inches. As the gantry 70 is moved along the tracks 20, the blades 84 will forcibly elevate the material onto the belts 86 of the conveyors 76 and 80 in a skimming-like operation. The reel 90 of each of the conveyors 76, 80, which is rotatably driven, assists in transferring the material onto the belts 86 of the conveyors 76 and 80. The conveyors 76, 80 elevate the material onto a conveyor 77 that extends from one end of the gantry 70 to the other end. The conveyor 77 transports the material received from the pick up conveyors 76, 80 onto the side conveyor 22. The side conveyor 22 conveys the material onto the cross conveyor 24 and the cross conveyor 24 in turn conveys the material to the unloading conveyor 26. The unloading conveyor 26 will deposit the material onto appropriate material handling equipment 100 at the unloading site.

When the gantry 70 has traversed the length of the barge 10 and the pick up conveyors 76, 80 approach and are near the end 16 of the hold 12, the pick up conveyors 76 and 80 are moved upwardly by the cylinders 88 (See FIGS. 1 and 8) and the opposite pick up conveyors 78, 82 are lowered toward the material. The pick up conveyors 78, 82 are shifted or repositioned to remove material from a different travel path, e.g., see the phantom line position of the pick up conveyors in FIG. 9. With the pick up conveyors 78, 82 lowered and with the blades 84 penetrating the material in the hold 12, the gantry 70 is moved in the opposite direction toward the other end of the barge to combine the skimming of material from the barge. The pick up conveyors 78, 82 elevate the material onto the gantry conveyor 77. The conveyor 77 transports the material to the side conveyor 22 which transports the material to the cross conveyor 24. The cross conveyor 24 transports the material to the unloading conveyor 26. The unloading conveyor 26 deposits the material to material handling equipment 100 at the site. Multiple passes are made by traversing the gantry 70 back and forth along the length of the hold 12. The carriages 72, 74 are positioned on the gantry 70 as required to affect the uniform removal of the material from the hold 12. It will be appreciated that numerous passes are required to remove one layer, e.g., of six inch to eight inch depth, and the process is repeated layer after layer until the hold is empty. The different layers of material are illustrated in FIG. 8 as dash lines 110 which may include as many as sixteen layers for, e.g., an 8' depth of material.

The ability to position the carriages 72, 74 independent of each other provides for a varied unloading pattern suited to the material received in the hold 12. The arrangement of the pick up conveyors 76, 80 and 78, 82 on the carriages 72, 74 provides a rapid removal of the material. The controlled movement of the gantry 70, the positioning of the carriages 72, 74 on the gantry and the controlled operating depth at which the pick up conveyors 76, 78, 80 and 82 operate assures a substantially uniform rate of removal of the material from the hold and thus desired balancing of the weight of the barge for level floating.

Motive power for the gantries 40 and 70 are provided by independent power units provided on each of the gantries. In this embodiment, hydraulic power is utilized and a known power unit 120 (See FIG. 1) such as a diesel engine and pump and suitable control equipment is provided for the gantry 70 and its related equipment. These are not detailed since they are well known in the art. Another power unit 122 (Also FIG. 1) is provided to provide the motive power for the conveyors 22, 24 and 26 as well as the pivoting and elevating of the offloading conveyor 26. A power unit 124 is provided for the gantry 40 and its related equipment.

Manual controls as well as an automatic controller, such as a computer 130 are provided to control the operation of the mechanisms for unloading and loading material onto the barge 10. The gantry 40, for example, may be manually controlled to travel at a rate relative to the barge 10 such that the gantry 40 is accurately positioned relative to the loading conveyor 52 as the barge 10 is moved to provide a uniform loading of the barge 10. The movement of the gantry 40 may also be controlled by the computer 130. Similarly the gantry 70 may be controlled manually or under automatic control by the computer 130 to control the operation of the movement of the gantry 70 on the barge 10 as well as the lowering and the depth control of the individual pick up conveyors 76, 78, 80 and 82 and the positioning of the carriages 72, 74. A preprogrammed pattern of removal of the material thus may be programmed to position the individual carriages 72, 74 on the gantry 70 as well as controlling the rate of travel and the travel direction of the gantry 70 along the barge 10.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A barge comprising:

a hold for containing loose materials including opposed side walls and opposed front and rear end walls and defining side wall and end wall upper edges;

a track assembly provided along said side wall upper edges, and an unloading gantry movably supported on said track assembly extending between the side walls, and movable back and forth on said track assembly between said front and rear end walls;

a second track assembly provided on said unloading gantry and a pick up conveyor mounted to the second track assembly and movable back and forth on said second track assembly between said side walls;

said pick up conveyor mounted for pivotal movement with its distal end projected from said unloading gantry toward one of said front and rear end walls and defining thereby a forward direction, said distal end controllably pivoted incrementally between a fully raised position and a fully lowered position, and a shearing member mounted to the distal end to project forwardly from said distal end of the pick up conveyor in a fixed relation to said distal end, and said shearing member in response to movement of the gantry in said forward direction providing forced penetration and skimming removal of the material contained in the hold and directing the material onto the pick up conveyor for conveying the material from the hold to the gantry; and a conveyor system mounted to the barge for receiving material from the pick up conveyor for depositing the material onto a shore position.

2. A barge as defined in claim 1 wherein the conveyor system includes a conveyor on the gantry for conveying material from the pick up conveyor to a side wall position, a conveyor along one side wall upper edge and at least one offloading conveyor pivotally mounted to the barge and pivotally extendable to the shore position for receiving material conveyed from said conveyor on the gantry and conveying the material to said shore position.

3. A barge as defined in claim 2 wherein the conveyor system also includes a conveyor along one end wall upper edge that receives material from said conveyor along the side wall upper edge and deposits the material on the offloading conveyor.

4. A barge as defined in claim 1 wherein the shearing member is a blade mounted at the distal end of the pick up conveyor for penetrating the loose material and directing the loose material onto the pick up conveyor, a powered reel mounted over the blade and including paddles for assisting the movement of the material from the blade onto the pick up conveyor.

5. A barge comprising:

a hold for containing loose materials including opposed side walls and opposed front and rear end walls and defining side wall and end wall upper edges;

a track assembly provided along said side wall upper edges, and an unloading gantry movably supported on said track assembly extending between the side walls, and movable back and forth on said track assembly between said front and rear end walls;

a second track assembly provided on said unloading gantry and a pick up conveyor mounted to the second track assembly and movable back and forth on said second track assembly between said side walls;

said pick up conveyor mounted for pivotal movement with its distal end pivoted between a raised position and a lowered position for engaging loose material in the hold, said distal end configured for penetration into the material as the gantry is moved and for conveying penetrated material from the hold to the gantry;

a second pick up conveyor mounted to the second track assembly, said pick up conveyor extended from the gantry downwardly toward the front end wall for picking up material when the gantry is moved toward the front end wall, and said second pick up conveyor extended from the gantry downwardly toward the rear end wall for picking up material when the gantry is moved toward the rear end wall; and a conveyor system mounted to the barge for receiving material from the pick up conveyor and the second pick up conveyor for depositing the material onto a shore position.

6. A barge as defined in claim 5 wherein the two pick up conveyors are mounted on a common carriage for common movement along the gantry, and a second carriage and a similar pair of pick up conveyors mounted on the second carriage whereby one pick up conveyor from each carriage is operating in both directions of gantry movement.

7. A barge as defined in claim 6 wherein the carriages are independently operable for varied positioning of the pick up conveyors and providing balanced removal of the material from the barge.

8. A barge as defined in claim 7 wherein a conveyor of the conveyor system extends along the gantry between the side walls of the barge and receives material from all of the pick up conveyors.

9. A system for unloading a barge having a large hold containing a load of loose material and having a substantially flat bottom and opposed side walls and opposed front and rear end walls comprising:

a gantry elevated over the load and extended between the side walls and movable back and forth repeatedly between the end walls;

a pick up conveyor pivotally mounted at one end to the gantry and movable along the gantry repeatedly between the side walls, said pick up conveyor having a distal end projected from said gantry toward one of said opposed front and rear end walls and defining a forward direction, a shearing member mounted to the distal end to project forwardly from the distal end of said pick up conveyor in a fixed relation to said distal end, and said shearing member in response to movement of the gantry in said forward direction providing forced penetration and skimming removal of the material contained in the hold and directing the material onto the pick up conveyor and said pick up conveyor conveying the material from the distal end to the gantry; and a conveyor system extended along the gantry for receiving material from the pick up conveyor and conveying the material to a side wall and therefrom to a position on shore.

10. A system for unloading a barge having a large hold containing a load of loose material and having a substantially flat bottom and opposed side walls and opposed front and rear end walls comprising:

a gantry mounted on the barge and extended between the side walls and movable back and forth between the end walls;

a pick up conveyor pivotally mounted at one end to the gantry and movable along the gantry between the side walls, said pick up conveyor having a distal end and being adjustable pivotally relative to the height of the material in the hold for penetrating the material to a desired depth and upon movement of the gantry between the end walls, said pick up conveyor conveying the penetrated material from the distal end to the gantry;

a second pick up conveyor, said pick up conveyor and said second pick up conveyor extended from said gantry downwardly at an angle, one toward the front end wall and the other toward the rear end wall, and a control for controlling the adjustability of the pick up conveyors whereby one pick up conveyor picks up material in one direction of gantry movement and the other pick up conveyor picks up material in the other direction of gantry movement; and a conveyor system extended along the gantry for receiving material from the pick up conveyor and the second pick up conveyor and conveying the material to a side wall and therefrom to a position on shore.

11. A system as defined in claim 10 wherein the pick up conveyors are controllably adjusted to varying positions along the gantry for removing material at selected positions between the side walls.

12. A system as defined in claim 11 wherein the conveyor system includes a first conveyor on the gantry for receiving material from the pick up conveyors and conveying the material to a side wall position, a second conveyor at said side wall for receiving material from the first conveyor and conveying the material to an end wall position, and an offloading conveyor for receiving material conveyed to said end wall position and conveying the material to an onshore location.

13. A barge having opposed side walls and end walls defining a large volume for receiving loose material wherein the material from an onshore location is conveyed by a conveyor to a fixed position of material deposit overlying the barge when docked, said barge movable in a forward and rearward repetitive motion while receiving the material to evenly distribute the material from one end wall to the other, said barge including apparatus to achieve side-to-side distribution of the material, which apparatus comprises:

a gantry mounted to and extended between the side walls of the barge and movable along the side walls from one end wall to the other on the barge;

a hopper mounted on the gantry and positionable at the fixed position of material deposit overlying the barge in a docked condition;

a conveyor having a length defined by opposed ends and reversibly operable to convey material deposited thereon toward either end, said conveyor mounted on and extended partially along the length of the gantry and under the hopper for receiving material from the hopper and conveying the material along the length of the conveyor, said conveyor being movable along the gantry whereby different portions of the conveyor are located under the hopper for receiving the material and the ends of the conveyor are adjustable along the length of the gantry whereby one or the other of the ends of the conveyor can be positioned over substantially the entire distance between the side walls of the barge, and a control for controlling the operable direction of the conveyor and the positioning of the conveyor during a loading process for spreading the material between the side walls; and a control for controlling movement of the gantry relative to the barge during forward and rearward movement of the barge for retaining the position of the hopper at said fixed position.

14. A barge comprising:

a hold for containing loose materials including opposed side walls and opposed front and rear end walls and defining side wall and end wall upper edges;

a track assembly provided along said side wall upper edges;

an unloading gantry and a loading gantry movably supported on said track assembly and adapted for unloading and loading operations respectively, each gantry extending between the side walls and movable between said front and rear end walls; and a parking position at one end of the hold for parking the loading gantry during non-use and a parking position at the other end of the hold for parking the unloading gantry during non-use, said parking positions designed to place the respective gantries in a non-interfering position relative to performance of the respective loading and unloading operations.

* * * * *